June 22, 1937.  R. PUDELKO  2,084,742
METER SYSTEM
Filed Aug. 28, 1930
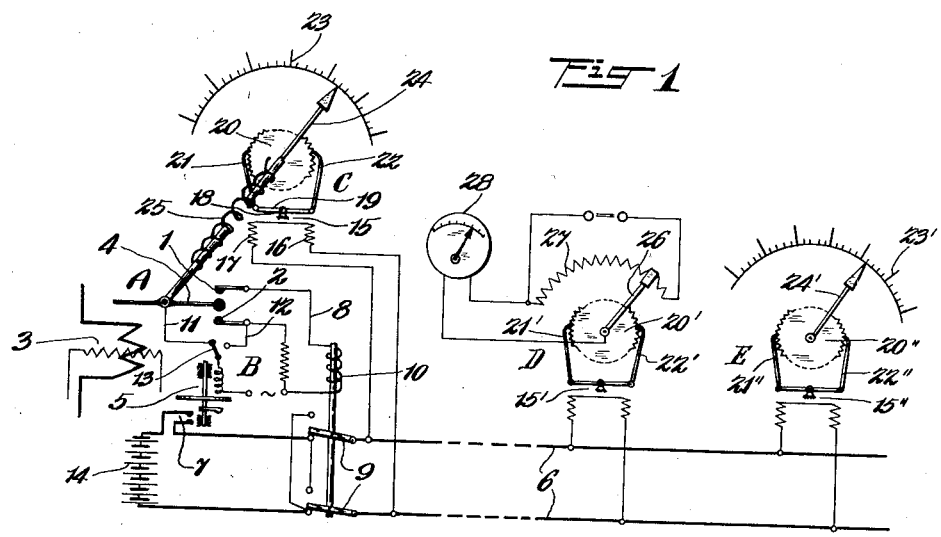
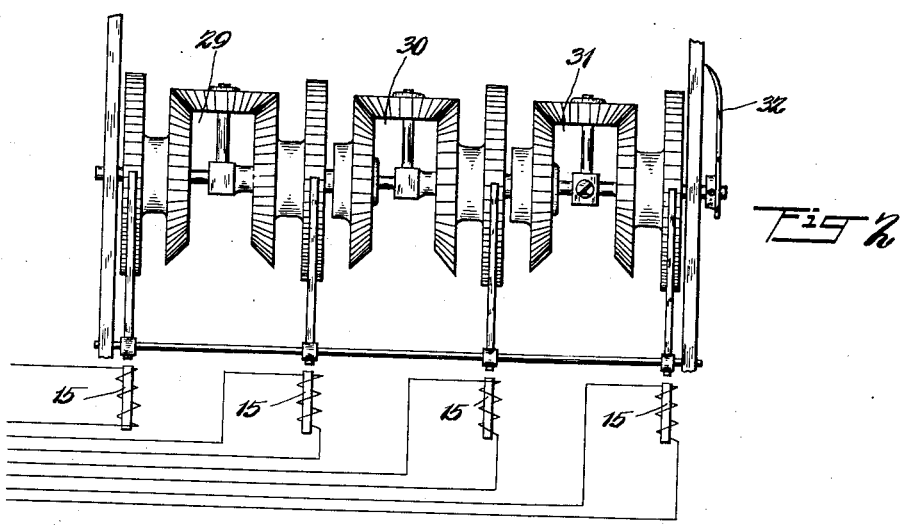
INVENTOR
Riccard Pudelko
BY
John D Morgan
ATTORNEY Patented June 22, 1937

2,084,742

UNITED STATES PATENT OFFICE 2,084,742

METER SYSTEM

Riccard Pudelko, Zug, Switzerland, assignor to Landis & Gyr, A-G., a corporation of Switzerland Application August 28, 1930, Serial No. 478,539
In Switzerland September 2, 1929

4 Claims. (Cl. 177—351)

The present invention relates to metering systems and particularly to remote metering systems which are adapted for use in the registration of metered quantities in a plurality of widely separated places.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements shown and described herein.

The accompanying drawing, referred to herein and constituting a part hereof, ilustrates one embodiment of the invention, and together with the description, serves to explain the principles of the invention.

Of the drawing:—

Fig. 1 is a diagrammatic figure illustrating a remote metering system in accordance with the present preferred embodiment of the invention; and Fig. 2 is a diagrammatic view illustrating a typical summation register which may be employed with the system shown in Fig. 1.

The present invention provides a novel energy transmission metering system which is based on the transmission of impulses proportional to the metered quantities, or variations in said quantities, as distinguished from other kinds of processes wherein the registration or indication is based on the variations in the characteristic properties of a current flowing in a transmission line connecting the sending and receiving instruments at the several stations.

The present invention has for an object the provision of a metering system which combines the advantageous features of both kinds of remote metering systems, while obviating the disadvantages which are inherent in those systems. The invention also provides a remote metering system which is thoroughly reliable and is not essentially dependent on the conditions of the line used, and is independent of defects in insulation, line resistance, and leakage, and the like.

The invention provides a novel remote metering system wherein impulses are transmitted only on changes in the metered quantity, thereby increasing the efficiency and accuracy of the system, and avoiding the necessity of sending a large number of impulses for full load or maximum registration in order to secure accurate registration of low load or minimum readings.

In accordance with the present preferred and illustrative embodiment of the invention, the metering system comprises a metering unit, an impulse transmitter controlled by the metering unit and one or more registers actuated by the impulses received from the transmitter. In said embodiment, a contact balance is employed which is controlled by the metering unit and is adapted to control a circuit on any change in the quantity being measured. As the contact balance closes the circuit on changes in the metered quantity, the impulse transmitter is set in operation and transmits impulses which gradually restore the balance of the contact balance and simultaneously actuate the registering receivers until the time when the balance is restored, the contacts of the contact balance are opened, and the transmission of impulses is interrupted. Preferably, and as embodied, the registering receivers and the contact balance include polarized relays, permitting actuation of the registers and balance in either direction in response to increases or decreases in the metered quantity.

It will be understood that the foregoing general description and the following detailed description as well, are exemplary and explanatory of the invention, but are not restrictive thereof.

In carrying out the process, use is made of the application of a contact balance at the transmitter end and controlled by the measuring instrument and by the balancing system. Since there is in the present case a current-impulse method and not a current-variation method, the contact balance does not effect the direct control of the balancing system producing a variation of the current of the transmission line, but merely the control of an impulse transmitter system influencing the remote receiving register and the balancing system.

For the production of the impulses, the system is provided with a motor, or the like, controlled by the balancing system which controls a contact device governing the impulses. This mechanism may be of any desired construction. It is not necessary that the movement have a constant number of revolutions, but on the contrary the number of revolutions may be subject to any desired fluctuation which is desirable or advantageous.

Connecting means are also provided which always effect a correct actuation corresponding to the two contact points of the contact balance of the receivers excited by the impulses. For instance, as connecting means may be used a reversing switch excited in the one contact position of the contact balance and effecting the reversing of the pole connections of the long distance line. It is understood that impulse relays of the receiver and the balancing system must be so constructed that at all times a pointer displacement in the desired direction is effected. For instance, to this end a polarized stepping relay acting in two directions can be used. Naturally, other methods of transmission of the impulses affecting the distant receivers and the balancing system are possible. The construction illustrated here is only given by way of example.

The coupling between the balancing system and a contact balance is preferably effected by mechanical means through the interposition of a spiral spring. Naturally, other couplings between balancing system and contact balance may be used. It would, for instance, be imaginable to make the return purely electrically as in the known contact balances.

In addition, the method of indication on the distant receiver may be effected in various ways. We shall describe here briefly only a few methods. The receiver impulse relay may directly produce the displacement of a pointer indicating the values or the variation of this condition of a circuit in which the receiver instruments are cut in. The latter can be effected in the manner that the impulse relay controls the movable contact of a potentiometer positioned in the receiver circuit. In place of a potentiometer, naturally a great many other electrical elements can be utilized, for instance, an induction control. This type of remote indication has the great advantage that the receivers are standard instruments of the indicating, recording or integrating type.

The sender impulse instrument is in addition provided with a reversing switch mounted in the control circuit of the movement which allows zero position of all indicating instruments. Should any inaccuracies of the indications of the measurements occur, synchronism can then easily be obtained. This reversing switch can be controlled by hand or, and that would be preferable, periodically by a clock.

The new long-distance measuring device is, as can be easily understood, adapted for adding the sums of a plurality of equal operating equivalents of various power units in a central station.

In the present exemplary embodiment, the transmitting station comprises a contact balance A, an impulse transmitting apparatus B controlled by contact balance A, and a balancing system C, stepping back the contact balance A.

Contact balance A comprises two contacts 1, 2 connected to control circuits of the impulse transmitting apparatus and a contact lever 4 movable between these contacts 1 and 2, and governed by a meter 3, and likewise positioned in the control circuit.

The impulse transmitting apparatus B has a mechanism 5, which controls a contact device 7, in transmission line 6, producing the impulses. In a branch 8 of the circuit controlling mechanism 5, a reversing switch relay 10 controls a pole reversing switch 9. A switch 13 is adapted to be alternately connected to branches 11 and 12 of the control circuit and thereby the closing of the control circuit may be effected either by hand or periodically by a clock. The line 6 is connected to any suitable current source 14.

The balancing system connected to the long-distance line 6 in the rear of the pole reversing switch 9 is provided with an impulse relay 15, constructed as a polarized stepped relay, and consisting of coils 16, 17 and a two-pole armature 19 mounted to rock about a point 18. To the ends of armature 19, pawls 21, 22 are pivotally connected, which alternatively actuate a ratchet wheel 20. The ratchet wheel 20 actuates a pointer 24, moving over a dial 23. A spiral spring 25 is connected at one end with ratchet wheel 20 and on the other end with contact lever 4 of contact balance A.

In the diagram of connections of Fig. 1, two distant receivers D, E are connected to the long distance line 6. These receivers D, E each comprises impulse relay 15', 15'', likewise constructed as a polarized stepped relay like the impulse relay 15 of balancing system C. In the first receiver D, ratchet wheel 20' is connected to a movable contact 26 of a potentiometer 27, connected to the source of current, the said potentiometer being cut in the measuring circuit containing a standard indicating instrument 28. In the second receiver E, the ratchet wheel 20'' effects the direct displacement of a pointer 24' movable over a dial 23'.

The operation of the hereinbefore described system is as follows:

At a change of the measurement equivalent, for instance, on a drop in power, contact arm 4 of watt meter 3 will come in contact with contact 2 closing the control circuit of mechanism 5. The contact device 7 actuated by mechanism 5 will then be recurrently closed and opened. The current impulses of the direct current source 14 thereby produced are sent across switch 9 into the long distance line 6, and energize the balancing system C and the distant receivers D, E. The pawls 21, 22 and 21', 22' and also 21'', 22'' of the impulse relay 15, 15', 15'' are correspondingly actuated, and effect a corresponding rotatory movement of all ratchet wheels 20, 20', 20'' of the step-back system C and the receivers D, E.

The rearward movement of ratchet wheel 20 of the balancing system C causes spring 25 to be released to a certain degree, and to be finally brought into a position in which the equilibrium between the two turning moments, that is, the turning moment of measuring instrument 3 and the turning moment of spring 25 counteracting the latter, is reproduced. Contact arm 4 will then become disengaged from contact 2 and will pass to its inoperative position. The control circuit of mechanism 5 is again interrupted and mechanism 5 is stopped. Since the impulse relays 15', 15'' of the long distance receiving apparatus D and E have received the same number of current impulses as impulse relay 15 of the balancing system C, the pointer positions of receivers D, E are identical with that of the balancing system C. The indications of the long-distance receiving instruments then indicate a measurement proportional to the value transmitted.

At increasing efficiency in the sender instrument 3, contact arm 4 will engage contact 1 and mechanism 5 is then controlled across the reversing relay 10, in the control circuit, which causes a pole reversal of the direct current source 14 connected to the long distance line 6. The impulses now created by the contact device 7 and sent into the long distance line 6 now energize the impulse relays 15, 15', and 15" in such manner that rotation of the ratchet wheels 20, 20', 20" is effected in the opposite direction. Only when the turning moments of spring 25 of the balancing system and of the measuring instrument 3 are again in balance, contact arm 4 will be disengaged from counter contact 1, and consequently, the control circuit of mechanism 5 be interrupted. The positions of the pointers of all indicating instruments C, D, E then correspond to the value transmitted.

By switching over switch 13 into the line branch 12, the control circuit is closed and mechanism 5 actuated. The impulses produced by contact device 7 and transmitted over long distance line 6 then effect the displacement of all pointers of the balancing system C and of the receiving instruments D and E to zero. In this manner all instruments are again brought into synchronism in case of any possible defects of connection.

To add the indications of measuring values of a plurality of sender stations to a receiver station, an adding long-distance measuring apparatus is illustrated in Fig. 2. The impulses emitted by the various sender stations actuate, respectively, corresponding relays 15, cooperating with differential gears 29, 30, 31. The revolutions of the planetary wheel of the individual differential gears 29, 30, 31 are added and transmitted to pointer 32.

The system of the present invention has all the advantages of the impulse process, impulses being given only when the operative efficiency changes; otherwise the mechanism is at a standstill. The retardation of the indications of the receivers can be kept very small approximately below a second. The receiver instruments further allow measuring down to zero value. The pointers of the receiver do not oscillate but stand still or move uniformly back and forth. A further advantage is that standard instruments can be used as indicating instruments, as a contact instrument may, for instance, be used as a modified counter for most operative values. The impulses themselves have no relation to the extent of operation but serve only the control of the long-distance receivers, the correct adjustment being effected by the balancing system. The long distance measuring apparatus furthermore permits of the transmission of any desired value which, if it is unable to directly act on the contact balance of the sender, is transformed in a suitable manner.

The invention in its broader aspects is not limited to the specific mechanisms shown and described but departures may be made therefrom within the scope of the accompanying claims without departing from the principles of the invention and without sacrificing its chief advantages.

What I claim is:

1. In a remote metering system, in combination, metering mechanism, a contact balance comprising a pivoted arm, operated by said metering mechanism and adapted to alternatively contact one or the other of two contact points, a transmission line connected to a source of direct current, a motor-operated switch in circuit with the transmission line for sending a continuous succession of impulses over said line, means connecting the contact balance in circuit with the motor, a reversing switch in the transmission line and means connected to said contact balance for operating the reversing switch by the contact balance for reversing the polarity of the impulses sent over the line.

2. In a remote metering system, in combination, metering mechanism, a contact balance comprising a pivoted arm, operated by said metering mechanism and adapted to alternatively contact one or the other of two contact points, a transmission line connected to a source of direct current, a motor-operated switch in circuit with the transmission line for sending a continuous succession of impulses over said line, means connecting the contact balance in circuit with the motor, a reversing switch in the transmission line, and means connected to said contact balance for operating the reversing switch by the contact balance for reversing the polarity of the impulses sent over the line, the contact balance serving to actuate the motor-operated switch under control of the metering mechanism until a number of impulses, proportional to a change in reading of the metering mechanism, have been sent over the line and then to disconnect said motor-operated switch.

3. In a remote metering system, in combination, metering mechanism, a contact balance comprising a pivoted arm, operated by said metering mechanism and adapted to alternatively contact one or the other of two contact points, a transmission line connected to a source of direct current, a motor-operated switch in circuit with the transmission line for sending a continuous succession of impulses over said line, means connecting the contact balance in circuit with the motor, a reversing switch in the transmission line, means connected to said contact balance for operating the reversing switch by the contact balance for reversing the polarity of the impulses sent over the line, and means cooperating with the contact balance adapted to restore it to its normal position under control of the metering mechanism after a number of impulses proportional to a change in reading of the metering mechanism have been sent over the line.

4. In a remote metering system, in combination, metering mechanism, a contact balance comprising a pivoted arm, operated by said metering mechanism and adapted to alternatively contact one or the other of two contact points, a transmission line connected to a source of direct current, a motor-operated switch in circuit with the transmission line for sending a continuous succession of impulses over said line, means connecting the contact balance in circuit with the motor, a reversing switch in the transmission line, means connected to said contact balance for operating the reversing switch by the contact balance for reversing the polarity of the impulses sent over the line, and an indicator connected to said transmission line including an indicating member and polarized relay actuating means actuated by said impulses and under control of the metering mechanism for moving said indicating member.

RICCARD PUDELKO.